United States Patent [19]
Franz et al.

[11] Patent Number: 5,271,771
[45] Date of Patent: Dec. 21, 1993

[54] CARBON-CONTAINING METAL OXIDE PIGMENTS

[75] Inventors: Klaus-Dieter Franz, Kelkheim; Klausg Ambrosius, Dieburg; Hans-Dieter Brückner, Darmstadt, all of Fed. Rep. of Germany

[73] Assignee: Merck Patent Gesellschaft mit beschränkter Haftung, Darmstadt, Fed. Rep. of Germany

[21] Appl. No.: 921,800

[22] Filed: Jul. 30, 1992

[30] Foreign Application Priority Data

Jul. 30, 1991 [DE] Fed. Rep. of Germany ....... 4125134

[51] Int. Cl.$^5$ ................................................ C09C 1/44
[52] U.S. Cl. .................................... 106/474; 106/472; 106/415
[58] Field of Search ..................... 106/472, 474, 415

[56] References Cited

U.S. PATENT DOCUMENTS

4,544,415  10/1985  Franz et al. ................ 106/288 R

FOREIGN PATENT DOCUMENTS

61-192749  8/1986  Japan .

*Primary Examiner*—Karl Group
*Assistant Examiner*—Chris Gallo
*Attorney, Agent, or Firm*—Millen, White, Zelano & Branigan

[57] ABSTRACT

The invention relates to carbon-containing plate-like pigments, obtainable by pyrolysis of carbon-containing compounds in the presence of either plate-like metal oxides or metal oxide mixtures or plate-like substrates coated with titanium dioxide and at least one further metal oxide under conditions in which the metal of the metal oxide is reduced.

17 Claims, No Drawings

CARBON-CONTAINING METAL OXIDE PIGMENTS

BACKGROUND OF THE INVENTION

The invention relates to carbon-containing plate-like pigments and to processes for their preparation and to their use.

Plate-like substrates, such as, for example, metals, metal oxides or plate-like materials coated with metal oxides are used in many technical fields. The incorporation of carbon in pigments produces particular coloring effects. These carbon-containing pigments are used not only for pigmenting paints, powder coatings, varnishes, printing inks, plastics and the like but also in cosmetic preparations.

The only prior method for preparing combinations of carbon/metal oxide mica pigments consists in applying carbon from an aqueous suspension using suitable surface-active auxiliaries or by pyrolysis of organic compounds. DE-AS 11 65 182 describes a complicated pyrolysis process, in which the carbon black is naturally only deposited on the pigment surface. In the process described in German Patent 25 57 796, a substrate is first mixed with a carbon black dispersion. The addition of a metal salt solution under hydrolysis conditions precipitates a carbon black-containing metal hydroxide layer on the substrate.

However, it has been found that the dried pigments are unsuitable for various applications, since they are not sufficiently wear-resistant. This property is extremely desirable especially for incorporation in cosmetics.

A further disadvantage is the frequently observable bleeding of the carbon black when the pigments are suspended in organic solvents for preparing coating systems.

Furthermore, these pigments are distinguished by a large decrease in luster, caused by adsorption and scattering phenomena of the coarsely divided, precipitated carbon black agglomerates.

Accordingly, there was a need for preparing carbon-containing pigments of high wear resistance, which have special coloring effects due to their carbon content and whose preparation does not require large technical expenditure. This object could be achieved by means of the present invention.

SUMMARY OF THE INVENTION

Surprisingly, it has now been found that when plate-like substrates coated with metal oxide are reacted with gaseous and solid hydrocarbons under $O_2$-free conditions, not only a reduction of the metal oxides but also precipitation of carbon take place. The direct decomposition of carbon-containing compounds under inert conditions on the oxidic surfaces at temperatures above 200° C. makes it possible to deposit directly very finely divided carbon particles in the desired amount as extremely wear-resistant coatings.

In contrast to JP 192749, where the precipitation of carbon onto $TiO_2$/mica in a reducing atmosphere is also described, the precipitation of carbon in the pigments according to the invention is induced by the reduction of the redox-active system.

Accordingly, the invention relates to carbon-containing plate-like pigments, obtainable by pyrolysis of carbon-containing compounds in the presence of either plate-like metal oxides or metal oxide mixtures or plate-like substrates coated with metal oxides or metal oxide mixtures under conditions in which the metal of the metal oxide is reduced.

For the reduction of the metal oxides or metal oxide mixtures on the substrate surface, any redox-active metal oxides known to a person skilled in the art can be used, preferably metal oxides which have a smaller redox potential than Ti III/IV. Examples of suitable metal oxides are $SnO$, $SnO_2$, $CuO$, $Ag_2O$, $Ce_2O_3$ and/or $CeO_2$ and in particular iron oxides.

Accordingly, the invention also includes the embodiment where the metal oxide or metal oxide mixtures is $Fe_2O_3$.

The invention also relates to a process for the preparation of carbon-containing pigments, which is characterized in that a plate-like metal oxide or metal oxide mixture or a plate-like substrate coated with titanium dioxide or titanium suboxides and at least one further metal oxide, preferably having a smaller redox potential than Ti III/IV, is exposed to the gas stream of a highly volatile hydrocarbon at temperatures, preferably at 200°–1000° C., in particular at 400°–900° C., or in that a liquid or solid carbon-containing compound is applied to the metal oxide or metal oxide mixture or to the substrate coated with metal oxide and then pyrolyzed, both variants being carried out with the exclusion of oxygen, thus reducing the metal of the metal oxide.

Preferred substrates are metal oxide platelets and plate-like (i.e., platelet-shaped) materials coated with metal oxides. Plate-like iron oxide and mica platelets coated with metal oxides (muscovite, phlogopite, synthetic mica) are particularly suitable. The latter pigments known as nacreous pigments are disclosed, for example, in German Patents and Patent Applications 14 67 568, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 35 017.

Various process variants can be used for preparing the carbon-containing pigments according to the invention. The simplest method of carrying out the reaction is by reacting the substrates in a gas stream of highly volatile hydrocarbons, such as, for example, methane, ethane, propane or butane, at 400°–1000° C. in a heated flow tube. Conversely, it is however likewise possible to deposite carbon-containing C, H, N or O compounds and polymers from an aqueous or organic suspension also in the form of insoluble salts of mono-to tetravalent cations or anions on the substrate to be coated, followed by pyrolysis. The oxygen:carbon ratio in these compounds is preferably $\leq 2$. Thus, it is also possible to precipitate salts of polycarboxylic acids and metal salts of higher carboxylic acids, such as, for example, lauric acid, palmitic acid, stearic acid or n-hexacosanoic acid, which then have an even more favorable, i.e. smaller, oxygen : carbon ratio, onto the pigment surface. Suitable salts of polycarboxylic acids are any salts known to a person skilled in the art, but preferably oxalates, in particular iron(II) oxalate are used.

Any acid or base can be used for precipitating the salts. The optimum concentrations and pH values can be determined by routine tests.

Advantageously, once the pH has been set to the value suitable for precipitation, it is maintained during the entire precipitation, in order to obtain uniform pigments.

Advantageously, the technically easily accessible bases, such as NaOH, KOH or ammonia and as acids dilute mineral acids, for example HCl or $H_2SO_4$, are used. Since the bases and acids are only used for changing the pH, their nature is not crucial, so that other bases and acids can also be used.

Under pyrolytic conditions, in which the metal of the metal oxide or the metal oxide mixture is reduced on the substrate surface, the carbon-containing compounds in the form of C, $CO_2$ and CO then react in accordance with the Boudouard equilibrium with the pigment surface in a nitrogen stream at temperatures above 200° C.

The carbon deposition in this process can be controlled by the metering of the hydrocarbon or by the metal oxide on the substrate surface.

The carbon content of the pigments according to the invention is in general between 1 and 90% by weight, preferably between 2 and 80%, relative to the entire pigment. Owing to the different substrates, the carbon content by weight can vary very widely.

With increasing amount of carbon, the pigment develops a more graphite-like luster.

The pigments prepared according to the invention are wear-resistant, so that they can be used for a wide range of applications, in particular in cosmetics.

Accordingly, the invention also relates to the use of the carbon-containing pigments in formulations, such as paints, dyes, plastics and cosmetics.

The invention furthermore relates to formulations containing the pigments according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 41 25 134.2, filed Jul. 30, 1991, are hereby incorporated by reference.

Example 1

An alkaline solution of 4 g of sodium stearate in 100 ml of water is metered into a suspension of 100 g of Iriodin 300 ($TiO_2/Fe_2O_3$, mica having a particle size of 10–60 μm from E. Merck, Darmstadt) in 1000 ml of water at a pH of 6, resulting in the precipitation of stearic acid while keeping the pH constant with 5% hydrochloric acid. The product is then filtered off, dried and pyrolysed at 800° C. in an $N_2$ gas stream.

This gives a light grey powder having a silvery luster and a carbon content of 2%.

Example 2

In a suspension of 100 g of Iriodin 100 ($TiO_2$ mica having a particle size of 10–60 μm from E. Merck, Darmstadt) in 1000 ml of water, 5% stearic acid (relative to the pigment used) is precipitated at a pH of 9 as calcium stearate using $CaCl_2$. The product is then filtered off, dried and pyrolysed at 400° C. in an $N_2$ gas stream. This gives a powder having a blue-grey luster.

Example 3

In a suspension of 100 g of Iriodin 100 ($TiO_2$ mica), iron oxalate (22.8 g of $FeC_2O_4$) is precipitated at a pH of 4 by adding an aqueous solution of $FeSO_4$ (44 g of $FeSO_4 \cdot 7 H_2O$ in 100 ml of water) and the stoichiometric amount of sodium oxalate (21.2 g of $Na_2C_2O_4$ in 100 ml of water) at 75° C. This is followed by decomposition at 800° C. in an N gas stream, giving a silver-grey ilmenite/ $TiO_2$/mica pigment. The FeO content is 11.3 g, which corresponds to about 10%.

Examples 4–13

Mica and metal oxide are reacted-in a gas stream (hydrocarbon/nitrogen) in a heated flow tube at elevated temperatures.

| Ex. | Metal oxide/ metal oxide mixture | Mica | % of hydrocarbon in the reaction stream of $N_2$ | Temperature °C. | % C (carbon) | Color |
|---|---|---|---|---|---|---|
| (4) | — | Muscovite | 5% $C_3H_8$ | 850° C. | 2.0* | light grey |
| (5) | $TiO_2$ | Muscovite | 5% $C_3H_8$ | 850° C. | 8.7 | silver-grey |
| (6) | $Fe_2TiO_5$ | Muscovite | 5% $C_4H_{10}$ | 850° C. | 30.4 | anthracite |
| (7) | $Fe_2O_3$ | Muscovite | 5% $CH_4$ | 850° C. | 65.1 | black |
| (8) | $Fe_2O_3$ | — | 5% $C_3H_8$ | 850° C. | 72.2 | black |
| (9) | $SnO_2$ | Muscovite | 5% $C_3H_8$ | 850° C. | 13.4 | black |
| (10) | $SnO_2/TiO_2$ | Muscovite | 5% $C_3H_8$ | 850° C. | 11.9 | silver-grey |
| (11) | $TiO_2$ | — | 5% $C_3H_8$ | 850° C. | 4.1 | light grey |
| (12) | $Fe_2TiO_5$ | — | 5% $C_3H_8$ | 850° C. | | dark blue |
| Comparative experiment | | | | | | |
| (13) | $TiO_2$ | Muscovite | 30% $H_2$ | 850° C. | no visible reaction | |

*Muscovite containing about 1% of $Fe_2O_3$ in the mineral as a trace component.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A carbon-containing platelet-shaped pigment, obtained by a process comprising pyrolyzing a carbon-containing compound in the presence of at least one platelet-shaped metal oxide or a platelet-shaped substrate coated with at least one metal oxide, other than a titanium oxide, under reducing conditions, whereby the metal of the metal oxide is reduced.

2. A pigment according to claim 1, wherein the metal oxide is $Fe_2O_3$, SnO, $SnO_2$, $Ag_2O$, CuO, $Ce_2O_3$, $CeO_2$ or a mixture thereof.

3. A pigment according to claim 1, wherein a platelet-shaped substrate coated with at least one metal oxide is used.

4. A pigment according to claim 3, wherein a nacreous pigment is used.

5. A pigment according to claim 4, wherein a platelet-shaped substrate coated with titanium dioxide and at least one additional metal oxide having a smaller redox potential than Ti III/IV is used.

6. A process for the preparation of a carbon-containing pigment, comprising reducing at least one plate-like metal oxide or a platelet-shaped substrate coated with at least one metal oxide by other than a titanium oxide, (1) exposing it at high temperature to a gas stream comprising a highly volatile hydrocarbon and nitrogen or by (2) applying a liquid or solid carbon-containing compound to the metal oxide or the substrate and then pyrolyzing the oxide, wherein in both (1) and (2), the process is carried out with the exclusion of oxygen, whereby the metal of the metal oxide is at least partially reduced.

7. A process according to claim 6, wherein the gas stream contains not more than 5% of the hydrocarbon.

8. A process according to claim 6, wherein the metal oxide is $Fe_2O_3$, $SnO$, $SnO_2$, $Ag_2O$, $CuO$, $Ce_2O_3$, $CeO_2$ or a mixture thereof.

9. A process according to claim 6, wherein a platelet-shaped substrate coated with at least one metal oxide is used.

10. A process according to claim 6, wherein a nacreous pigment is used.

11. A pigment prepared by the process of claim 6.

12. A pigment prepared by the process of claim 10.

13. In a cosmetic preparation, paint, dye or plastic, comprising a carbon-containing pigment, the improvement wherein the pigment is one of claim 1.

14. In a cosmetic preparation, paint, dye or plastic, comprising a carbon-containing pigment, the improvement wherein the pigment is one of claim 11.

15. In a cosmetic preparation, paint, dye or plastic, comprising a carbon-containing pigment, the improvement wherein the pigment is one of claim 12.

16. A process according to claim 6, wherein a platelet-shaped substrate coated with titanium dioxide and at least one additional metal oxide having a smaller redox potential than Ti III/Iv is used.

17. A process according to claim 6, comprising reducing at least one platelet-shaped metal oxide or platelet-shaped substrate coated with at least one metal oxide, other than a titanium oxide, by exposure at high temperature to a gas stream comprising a highly volatile hydrocarbon and nitrogen, whereby carbon is precipitated onto the surface of the substrate.

* * * * *